Patented Nov. 3, 1925.

1,559,925

UNITED STATES PATENT OFFICE.

HERBERT A. WINKELMANN, OF AKRON, AND HARLAN L. TRUMBULL, OF HUDSON, OHIO, ASSIGNORS TO THE B. F. GOODRICH COMPANY, OF NEW YORK, N. Y., A CORPORATION OF NEW YORK.

COMPOSITION OF MATTER AND METHOD OF PRODUCING THE SAME.

No Drawing.    Application filed September 20, 1923.    Serial No. 663,924.

*To all whom it may concern:*

Be it known that we, HERBERT A. WINKELMANN and HARLAN L. TRUMBULL, citizens of the United States, residing at Akron, and of Hudson, Ohio, respectively, in the county of Summit and State of Ohio, have invented a certain new and useful Composition of Matter and Method of Producing the Same, of which the following is a specification.

This invention relates to rubber or similar compositions and methods of producing the same, and more particularly to the vulcanization of rubber compounds by the use of vulcanization accelerators.

Thiocarbanilide and its homologues are widely used as accelerators for the vulcanization of rubber by sulfur. One of their characteristic properties is their low accelerating power in absence of zinc oxide, and another is their tendency to scorch or burn the rubber mix during milling and calendering when zinc oixde is used. Thiourea itself has found little use as an accelerator, due to its low curing power and its tendency to produce porous products. Another undesirable property of this class of accelerators is their tendency to agglomerate while being mixed into rubber, whereby non-uniform mixes result, causing overcured spots in the vulcanized product. This is especially noticed in mixes having a high rubber content, where there is not sufficient pigment present to result in a proper dispersion of the accelerator throughout the rubber mix.

A further disadvantage of thiourea accelerators is the necessity of using comparatively large amounts of accelerator in order to bring out their full curing power in the presence of zinc oxide.

The object of our invention is to provide a new class of accelerators, derived from thioureas, having certain advantages such as fluxing well with the rubber, absence of scorching during factory processing, suitability for use with or without zinc oxide, high curing power when used in small amounts, and comparative cheapness.

We find that aldehydes, and especially open chain aldehydes, react with thiourea or its derivatives such as diphenyl- or di-o-tolyl-thiourea to produce resin like products having the desired properties as accelerators for the vulcanization of rubber and the like with sulfur.

For the preparation of our new type of accelerators we admix the aldehyde with the thiourea and produce reaction by subjecting the mixture to heat under suitable conditions, depending on the properties of the constituents, such as volatility, melting point or temperature of reaction. Solvents may or may not be used, as desired. The aldehyde and the thiourea are preferably mixed in such proportions as to provide for a reaction of one mol of aldehyde with one mol of the thiourea. The reaction product is then heated to remove solvent, if the latter is used, and the heating is preferably continued until the melt on cooling has a consistency, approximating that of ordinary rosin, such that it may be pulverized, will soften on the rubber mill and may be thoroughly incorporated into the rubber.

The advantages of aldehyde condensation products of thioureas as accelerators are clearly shown when compounded into a rubber mix comprising rubber 100, zinc oxide 10, sulfur 5 and accelerator 0.8 (parts by weight). As compared with the corresponding thioureas the aldehyde condensation products show 30% to 60% higher tensiles, 15 to 40 minutes shorter curing time at 286° F., and give vulcanizates which age much better in the standard ageing tests at 70° C. in an oven. Eight tenths of a percent of a thiourea is far too low to bring out full curing power, while the aldehyde condensation products of thioureas may be used in amounts as low as 0.4 to 0.5% with desirable results.

Aromatic or closed chain aldehydes, such as benzaldehyde or furfural, when caused to react on thiourea provide accelerators superior in many respects to the thioureas themselves. The open chain aldehyde products are preferable to those of the closed chain aldehydes, their superiority in general increasing with the number of carbon atoms in the aldehyde. For example, while the formaldehyde reaction product of thiocarbanilide is a more efficient accelerator than thiocarbanilide itself, the acetaldehyde product is still more active, and the products prepared from aldehydes having more than two carbon atoms, such as butylaldehyde, heptaldehyde and aldol are more active than any of the products above mentioned.

We do not wholly limit our claims to any specific ratios of aldehyde to thiourea nor to any definite chemical compound, as the exact composition of this class of compounds is believed to be at present unknown.

We claim:

1. The method of producing a composition of matter which comprises mixing rubber or similar material with a vulcanizing agent and the condensation product of an aldehyde with a substituted thiourea and vulcanizing the mix.

2. The method of producing a composition of matter which comprises mixing rubber or similar material with a vulcanizing agent and the condensation product of an aldehyde with a disubstituted thiourea and vulcanizing the mix.

3. The method of producing a composition of matter which comprises mixing rubber or similar material with a vulcanizing agent and the condensation product of an aldehyde with thiocarbanilide and vulcanizing the mix.

4. The method of producing a composition of matter which comprises mixing rubber or similar material with a vulcanizing agent and the condensation product of an open chain aldehyde with an arylated thiourea and vulcanizing the mix.

5. The method of producing a composition of matter which comprises mixing rubber or similar material with a vulcanizing agent and the condensation product of an open chain aldehyde with a diarylated thiourea and vulcanizing the mix.

6. The method of producing a composition of matter which comprises mixing rubber or similar material with a vulcanizing agent and the condensation product of an open chain aldehyde with thiocarbanilide and vulcanizing the mix.

7. The method of producing a composition of matter which comprises mixing rubber or similar material with a vulcanizing agent and the condensation product of a hydroxy aldehyde with a thiourea and vulcanizing the mix.

8. The method of producing a composition of matter which comprises mixing rubber or similar material with a vulcanizing agent and the condensation product of a hydroxy aldehyde with a disubstituted thiourea and vulcanizing the mix.

9. The method of producing a composition of matter which comprises mixing rubber or similar material with a vulcanizing agent and the condensation product of a hydroxy aldehyde with thiocarbanilide and vulcanizing the mix.

10. The method of producing a composition of matter which comprises mixing rubber or similar material with a vulcanizing agent and the condensation product of aldol with a thiourea and vulcanizing the mix.

11. The method of producing a composition of matter which comprises mixing rubber or similar material with a vulcanizing agent and the condensation product of aldol with a disubstituted thiourea and vulcanizing the mix.

12. The method of producing a composition of matter which comprises mixing rubber or similar material with a vulcanizing agent and the condensation product of aldol with thiocarbanilide and vulcanizing the mix.

13. A composition of matter comprising the vulcanization product of a mixture of rubber or the like with a vulcanizing agent and the condensation product of an aldehyde with an arylated thiourea.

14. A composition of matter comprising the vulcanization product of a mixture of rubber or the like with a vulcanizing agent and the condensation product of an aldehyde with a diarylated thiourea.

15. A composition of matter comprising the vulcanization product of a mixture of rubber or the like with a vulcanizing agent and the condensation product of an aldehyde with thiocarbanilide.

16. A composition of matter comprising the vulcanization product of a mixture of rubber or the like with a vulcanizing agent and the condensation product of an open chain aldehyde with an arylated thiourea.

17. A composition of matter comprising the vulcanization product of a mixture of rubber or the like with a vulcanizing agent and the condensation product of an open chain aldehyde with a diarylated thiourea.

18. A composition of matter comprising the vulcanization product of a mixture of rubber or the like with a vulcanizing agent and the condensation product of an open chain aldehyde with thiocarbanilide.

19. A composition of matter comprising the vulcanization product of a mixture of rubber or the like with a vulcanizing agent and the condensation product of a hydroxy aldehyde with a thiourea.

20. A composition of matter comprising the vulcanization product of a mixture of rubber or the like with a vulcanizing agent and the condensation product of a hydroxy aldehyde with a disubstituted thiourea.

21. A composition of matter comprising the vulcanization product of a mixture of rubber or the like with a vulcanizing agent and the condensation product of a hydroxy aldehyde with thiocarbanilide.

22. A composition of matter comprising the vulcanization product of a mixture of rubber or the like with a vulcanizing agent and the condensation product of aldol with a thiourea.

23. A composition of matter comprising the vulcanization product of a mixture of rubber or the like with a vulcanizing agent and the condensation product of aldol with a disubstituted thiourea.

24. A composition of matter comprising the vulcanization product of a mixture of rubber or the like with a vulcanizing agent and the condensation product of aldol with thiocarbanilide.

In witness whereof we have hereunto set our hands this 10th day of September, 1923.

HERBERT A. WINKELMANN.
HARLAN L. TRUMBULL.